United States Patent [19]

Royer et al.

[11] 4,028,663
[45] June 7, 1977

[54] DIGITAL COMPUTER ARRANGEMENT FOR HIGH SPEED MEMORY ACCESS

[75] Inventors: Robert Dale Royer, Naperville; Thomas Frank Schwab, Lisle, both of Ill.

[73] Assignee: Bell Telephone Laboratories, Incorporated, Murray Hill, N.J.

[22] Filed: June 5, 1974

[21] Appl. No.: 476,435

[52] U.S. Cl. .......................................... 340/172.5
[51] Int. Cl.² ........................................ G06F 13/00
[58] Field of Search .................. 340/172.5; 445/1

[56] References Cited

UNITED STATES PATENTS

| | | | |
|---|---|---|---|
| 3,302,177 | 1/1967 | Bina | 340/172.5 |
| 3,413,613 | 11/1968 | Bahrs et al. | 340/172.5 |
| 3,478,321 | 11/1969 | Cooper et al. | 340/172.5 |
| 3,699,530 | 10/1972 | Capowski et al. | 340/172.5 |
| 3,710,324 | 1/1973 | Cohen et al. | 340/172.5 |

*Primary Examiner*—Harvey E. Springborn
*Attorney, Agent, or Firm*—John C. Albrecht; Frederick W. Padden; Paul E. Kudirka

[57] ABSTRACT

A data processing arrangement is disclosed including a central processing unit, a plurality of peripheral units coupled to a peripheral bus, a memory access controller, a first memory bus, and a second memory bus. The first memory bus serves a first plurality of memory units and the second memory bus serves a second plurality of memory units. The memory access controller selects which of the peripheral units may use the peripheral bus to access a memory bus during a particular time interval. If use of a particular memory bus is requested by a peripheral unit for an interval in which that memory bus is required by the central processing unit, the memory access controller preempts the usage of that memory bus by the peripheral unit for the interval. In addition, when a peripheral unit which has been permitted to use the peripheral bus is preempted from actually communicating with a memory in a particular interval, the memory access controller operates in combination with the peripheral units to maintain the priority of the preempted peripheral unit for requesting use of the peripheral bus during the next possible interval.

15 Claims, 8 Drawing Figures

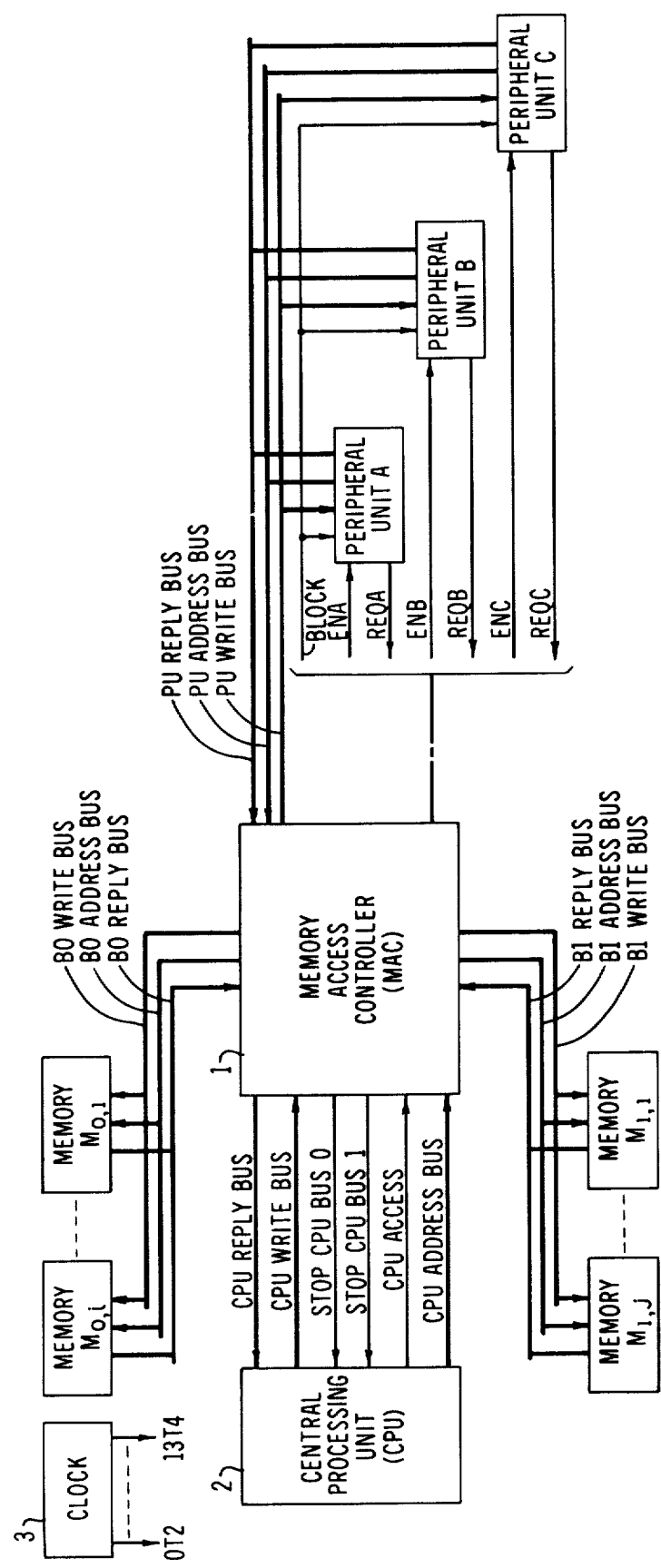

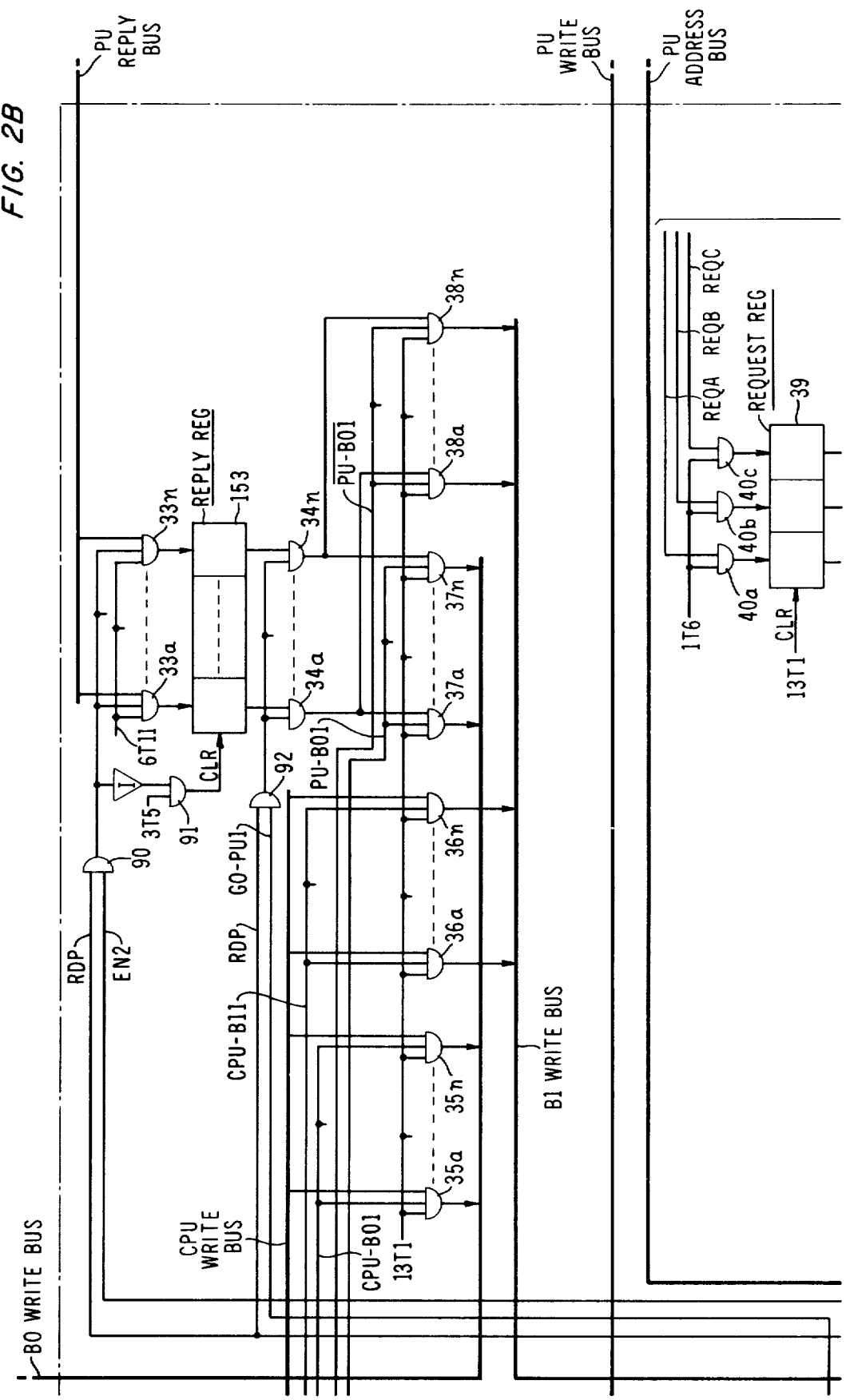

DIGITAL COMPUTER ARRANGEMENT FOR HIGH SPEED MEMORY ACCESS

BACKGROUND OF THE INVENTION

1. Field of the Invention

This invention relates to the field of data processors and more specifically to data processors employing a plurality of peripheral units connected by means of data buses and private lines to a selection means.

2. Description of the Prior Art

Data processor technology has advanced in recent years to the point that in some instances the inherent propagation delay in the transfer of information from two physical points consumes a substantial portion of the time available for data processing. It has, therefore, become necessary to minimize such propagation delays or, at least, to minimize the ill effects of such delays. The method most used in the past to minimize delay has been to minimize the physical separation of communicating components of a digital system. However, the minimization of the physical separation of communicating components is constrained by many factors and, at some point in such minimization, a practical limit is reached. At that point, actual propagation delay can be minimized no further and methods must be sought to minimize the ill effects of the residual propagation delay.

The problem of propagation delay is especially significant in systems employing a plurality of peripheral units connected by a peripheral bus to a means of peripheral unit selection. The communication efficiency of the entire peripheral unit community may be limited by the physical propagation delays. In such a system, it is necessary to select the peripheral unit to use the peripheral bus for a particular interval of time in the most efficient manner for minimizing the effect of the propagation delay. More specifically, the interchange of request and control signals required for the selection of a particular one of the many peripheral units to use the peripheral unit bus must either be minimized or advantageously interleaved with data transfer. This is particularly true in a system in which it is possible that a peripheral unit, once having been selected to use the peripheral bus, may be preempted from its communication function over that bus by, for example, a conflict with the needs of the central processor.

Several systems have been developed which effectively minimize the deleterious effects of propagation delays on the efficiency of a peripheral unit community by advantageous use of control signals. However, these systems do not minimize the deleterious effects of propagation delay when the possibility of peripheral unit preemption is considered. More specifically, these systems are not capable of minimizing the deleterious effects of propagation delays on a peripheral bus in the situation where a peripheral unit selected to use the peripheral bus actually uses it to transfer data and also in the situation where a peripheral unit selected to use the peripheral bus is not permitted to complete its data transfer operation.

SUMMARY OF THE INVENTION

A data processor arrangement in accordance with this invention minimizes the effects of propagation delay on a peripheral bus by employing a succession of bus request signals from each requesting peripheral unit. The peripheral unit which is to use the bus is selected on the basis of the received request signals. Thereafter, particular signals are transmitted to all peripheral units if use of the peripheral bus by any peripheral unit for actual data communication is preempted. In response to such signals, the selected peripheral unit is enabled to transmit additional request signals.

Specifically, peripheral units desiring access to the data processor memories generate repetitive access request signals to bid for use of the memories. A priority circuit in a memory access controller receives the request signals and selects one peripheral unit on the basis of a predetermined priority. The selected peripheral unit is then enabled by circuitry in the memory access controller to generate an address designating the memory which the enabled peripheral unit desires to access. The enabled peripheral unit contains a sequencer which controls a generation of the address code in response to an enabling signal from the memory access controller. The memory access controller circuitry receives and decodes the address generated by the enabled peripheral unit. A comparator compares the decoded address received from the enabled peripheral unit with an address received from a central processor to determine if the memory selection by the peripheral unit conflicts with a memory selection by the processor.

It is a feature of the present invention that the memory access controller receives a second set of request signals from the peripheral units and timing circuitry controls processing of the second set of request signals simultaneously with the decoding of the address received from the enabled peripheral unit. Therefore, if a conflict between memory selections by the peripheral units and memory selections by the central processor is detected by the comparison circuitry in the memory access control, the control has already processed the second set of requests and is therefore ready to enable address generation in another peripheral unit without waiting for a new set of requests to be forwarded from the peripheral units.

It is a further feature of the present invention that the sequencer provided in each peripheral unit cooperates with additional circuitry to enable the request generating circuitry in the unit to make one subsequent access request after a prior access request has been accepted by the memory access controller. The subsequent request is included in the second set of requests and thus the unit will be ready to start another access cycle if the prior request is preempted.

It is still a further feature of the present invention that the memory access controller comprises two priority circuits; a first of which is responsive to a set of requests from the peripheral units for determining the highest priority request in the set of requests, including a subsequent request by the unit currently being processed. The second priority circuit is responsive to the same set of requests from the peripheral units for determining the next highest priority unit by eliminating from priority consideration the additional request from the unit currently being processed. The two priority circuits operate simultaneously so that the highest priority unit may be reenabled if a conflict develops between memory access requests generated by the highest priority unit and the central processor. The next highest priority unit may be enabled by the two priority circuits in the absence of a conflict.

It is another feature of the present invention that circuitry is provided in the memory access controller for enabling the peripheral unit with next highest priority simultaneously with the reception of data from the peripheral unit with highest priority if the highest priority peripheral unit is allowed to complete its access requests to its designated memory.

It is yet another feature of the present invention that the sequencer contained in each peripheral unit is comprised of a chain of bistable devices and circuitry is provided for sequentially changing the state of each of the devices. According to the specific embodiment of the invention, each bistable device controls one portion of the circuitry in the peripheral unit. As the chain of bistable devices is sequentially stepped, the functions of request generation, address generation, and data transfer are performed.

Advantageously, according to one aspect of the invention, the sequential changing of the bistable device states is started by circuitry responsive to the reception of an enabling signal from the memory access controller and the chain of bistable devices disables the memory access request generator after one subsequent request has been generated.

According to another feature, circuitry is provided for resetting the chain of bistable devices if a conflict between memory selections by the peripheral units and memory selections by the central processor is detected by the comparator in the memory access controller. The chain of bistable devices is reset before the memory access request generator is disabled so that the enabled peripheral unit continues to generate memory access requests.

BRIEF DESCRIPTION OF THE DRAWING

FIG. 1 shows a general block diagram of a digital computer arrangement employing applicants' invention;

FIG. 2, including FIG. 2A through 2D, shows a detailed schematic diagram of the memory access controller shown in FIG. 1;

In FIG. 1 a block diagram representation of a system employing our invention to communicate between a plurality of peripheral units and a plurality of memories or a plurality of memory buses is shown. More specifically, it can be seen that the peripheral units A, B, and C are connected by the peripheral unit (PU) bus, comprising the PU reply bus, the PU address bus, and the PU write bus, to the memory access controller (MAC) 1. These buses are used for communication of data and addresses between the peripheral units and the MAC 1. It can also be seen in FIG. 1 that each of the peripheral units has two individual control lines connecting it with the MAC 1. In addition, a common control line connects all peripheral units to the MAC 1. The significance of these control lines will be discussed below.

Figure 2A:
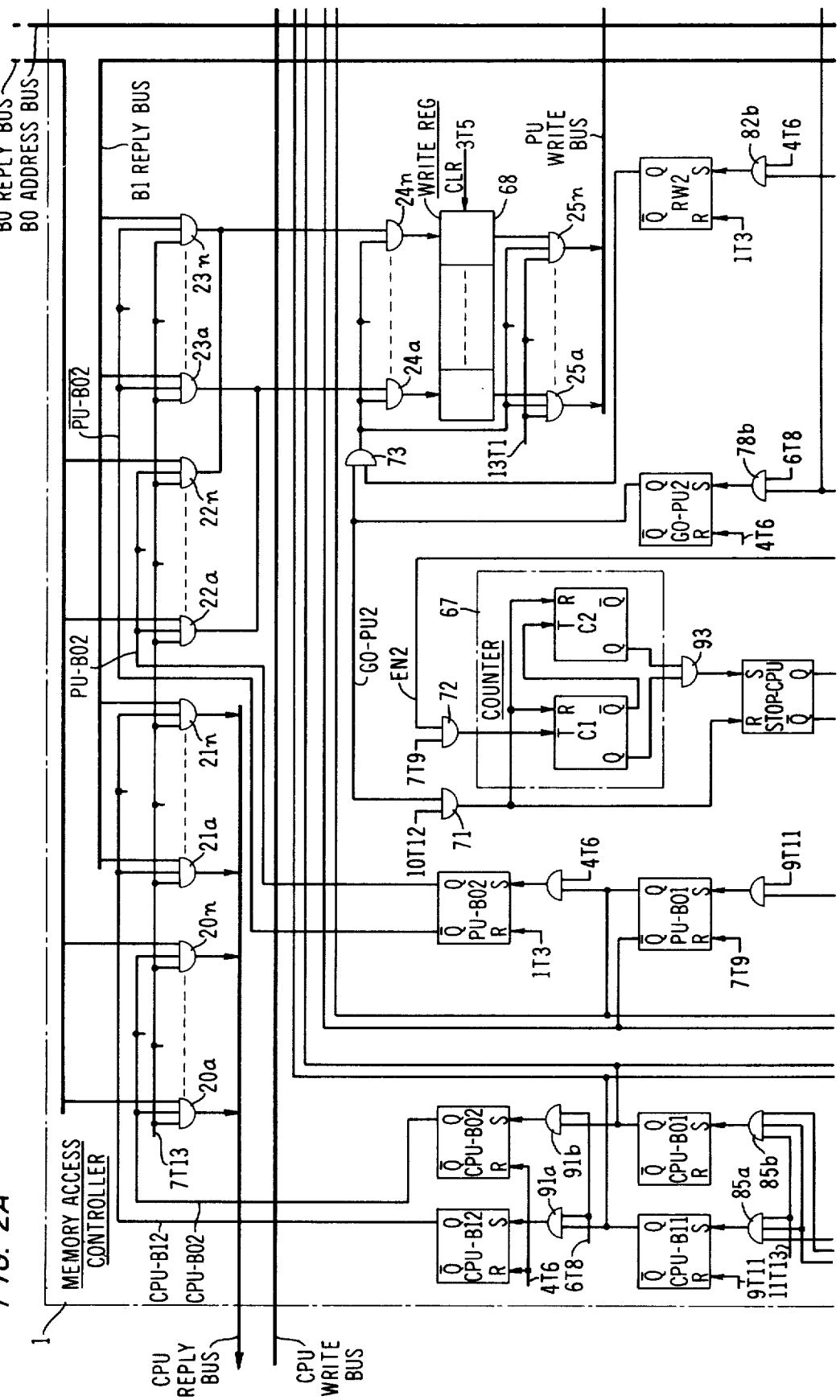

The MAC 1 also is connected to a plurality of other buses. A first of these is the memory bus B0, comprising the B0 write bus, the B0 address bus, and the B0 reply bus, which is used to communicate data and addresses to and from the memories $M_{0,1}$ through $M_{0,i}$. A second of these buses is the memory bus B1, comprising the B1 write bus, the B1 address bus, and the B1 reply bus, which is used to communicate data addressed to and from the memories $M_{1,1}$ through $M_{1,j}$. Thus, the memories $M_{0,1}$ through $M_{0,i}$ and the memories $M_{0,1}$ through $M_{0,i}$ and the memories $M_{1,1}$ through $M_{1,j}$ are connected to the MAC 1 by separate and distinct buses.

The MAC 1 is also connected to the central processing unit (CPU) 2 by means of a plurality of control lines and data buses. Specifically, the CPU 2 is connected to the MAC 1 by the CPU bus, comprising the CPU reply bus, the CPU address bus, and the CPU write bus. In addition, control lines are provided for signals CPU ACCESS, STOP CPU BUS 0, and STOP CPU BUS 1. As in the case of the control signals provided to the peripheral units from the MAC 1, the significance of the control signals communicating between the CPU 2 and the MAC 1 will be described below.

Also shown in FIG. 1 is a clock 3 which provides a plurality of output signals (FIG. 4) for control of operations within the CPU 2 (FIG. 1), the MAC 1, and the peripheral units A, B, and C. Thus, it is to be understood that all three of these units, as well as the memory units M comprising the units $M_{0,1}$ through $M_{0,i}$ and $M_{1,1}$ through $M_{1,j}$ are in synchronous operation based upon clock signals provided by the clock 3. As will be described in more detail below, in this particular illustrative embodiment, the memory units M operate on a memory cycle which is equal to two CPU or MAC cycles, referred to herein as controller cycles. The invention is not limited to such memory units, however.

For purposes of illustration, three peripheral units, namely peripheral units A, B, and C, have been shown. It should be understood, however, that there is no limit to the number of peripheral units or, for that matter, the number of memories which may be accommodated by applicants' invention. Moreover, also for purposes of illustration, it is assumed that the peripheral unit A is physically closer to the MAC 1 on the respective PU buses than is the peripheral unit B, and, similarly, peripheral unit B is closer to the MAC 1 on the PU buses than is the peripheral unit C. This, too, is not critical to the invention but is assumed merely for illustrative reasons. Finally, it may be assumed that the peripheral unit A is assigned a peripheral bus priority greater than that of the peripheral units B and C and the peripheral unit B is assigned a priority greater than that of the peripheral unit C. The assigned priorities are used to determine, in the case of a conflict between peripheral units, which of the two or more conflicting peripheral units is to be awarded use of the PU buses.

Generally, when the peripheral unit A requires access to one of the memories served either by the B0 or the B1 buses, it transmits a request signal, REQA = "1", to the MAC 1. If substantially simultaneously the peripheral unit B also elects to access one of the memories M, it also sends a request signal, namely the signal REQB = "1", to the MAC 1. Only one of the two peripheral units may be permitted to use the PU bus for accessing any of the memories at any one time. Therefore, the conflict between the two peripheral units must be resolved. As mentioned above, such a conflict is resolved by selecting the higher priority peripheral unit, namely, the peripheral unit A, as the preferred peripheral unit to use the peripheral unit bus. As a result, the MAC 1 transmits a signal ENA = "1" to the peripheral unit A. In response to that signal, the peripheral unit A uses the PU address bus to transmit to the MAC 1 the address of the memory location it wishes to access. It should be noted that included in the address is a code defining which of the memory buses B0 or B1 serves the memory containing the location to be accessed. The address is stored in the MAC 1. Moreover, if the operation to be performed is a write operation, that is, an operation in which specific data are to be stored in the memory, the data to be stored are applied to the PU reply bus following the receipt of the enable signal. Thereafter, absent a conflicting need for the same memory bus by the CPU 2, the appropriate memory is accessed using the memory bus specified by the aforementioned code. If a conflict does arise, however, additional signals are employed to effect the ultimate transfer of data for the peripheral unit. A thorough explanation of this situation requires reference to FIG. 2 and 3, however.

Figure 2C:
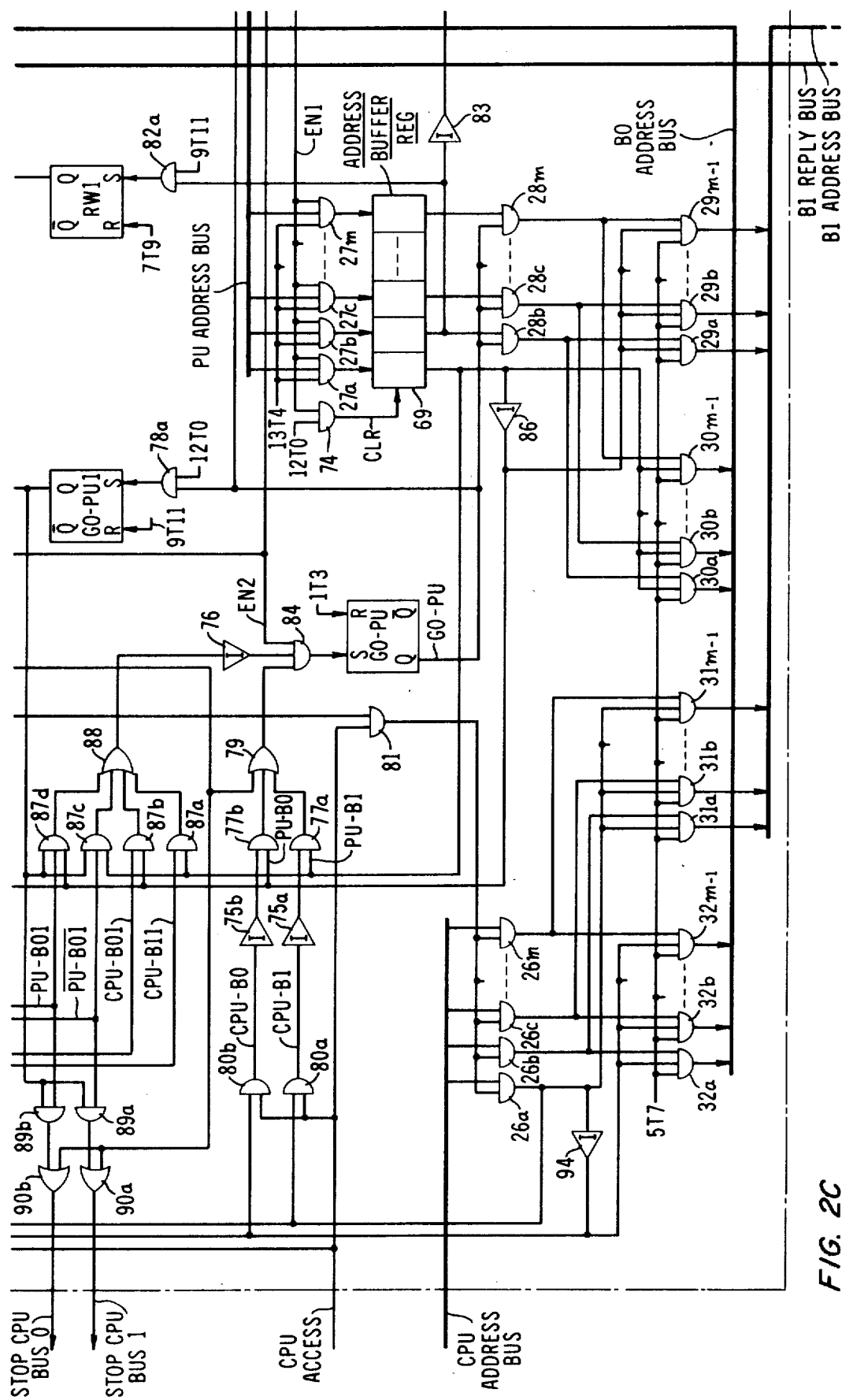
Figure 2D:
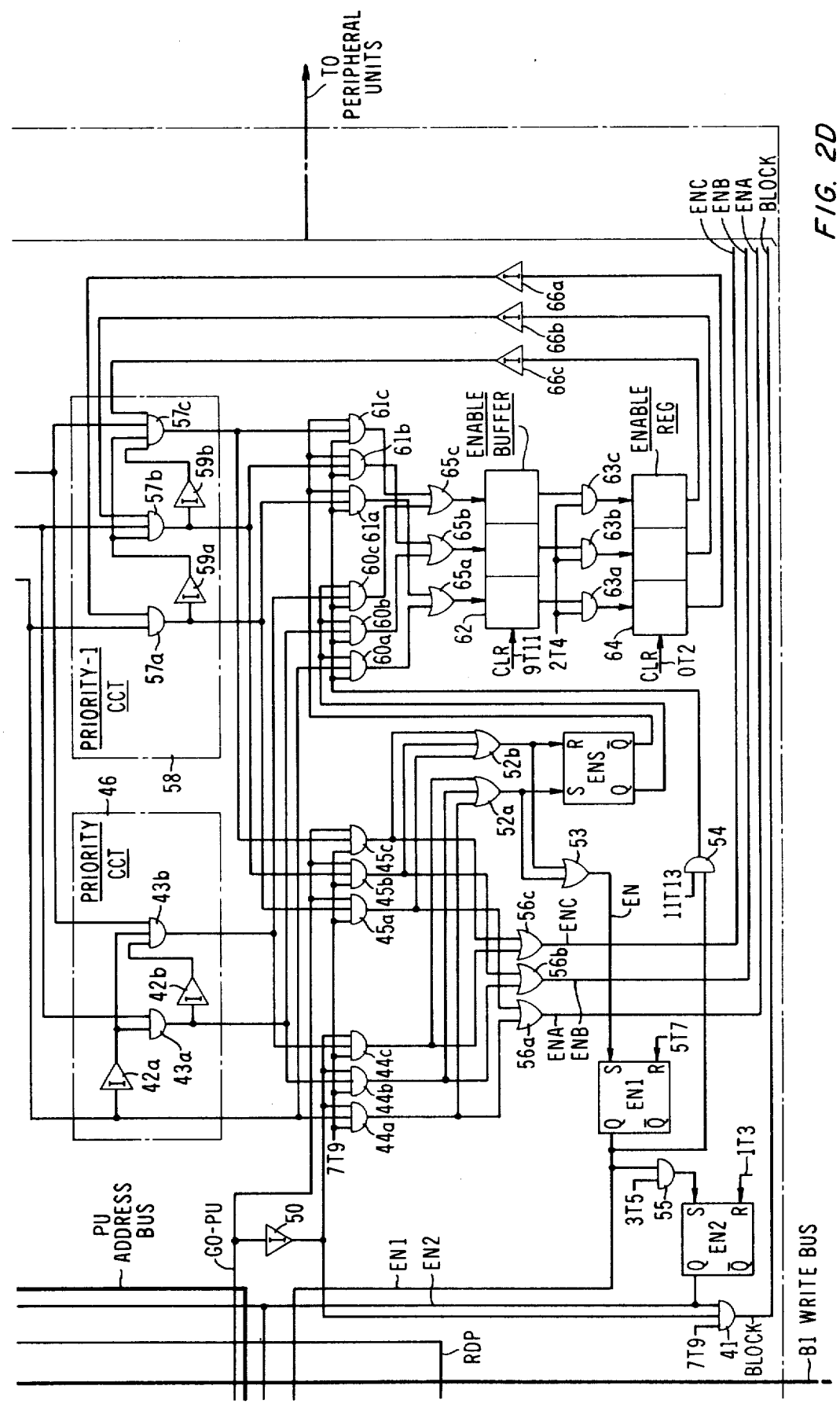
Figure 3:
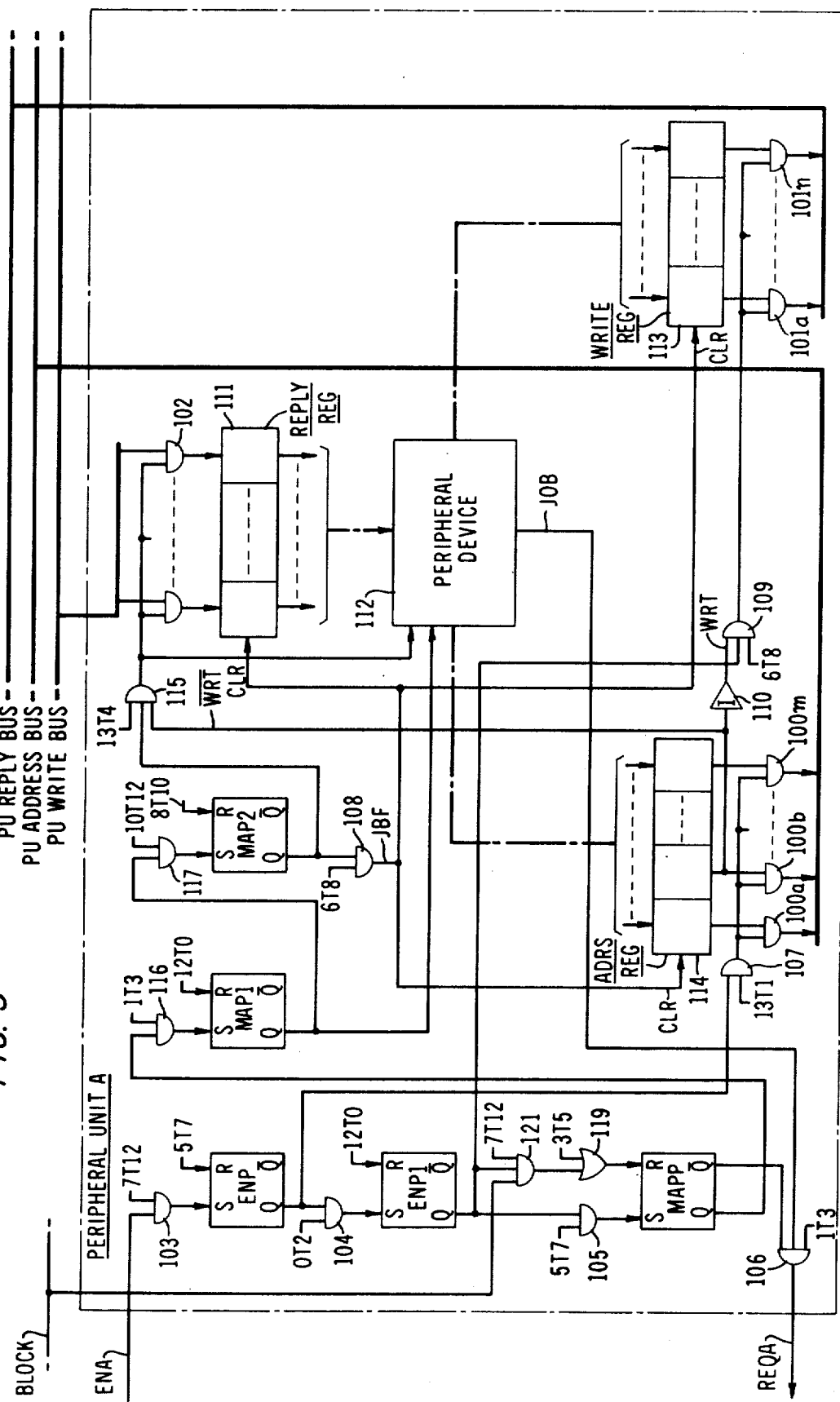
FIG. 3 shows a detailed schematic diagram of the peripheral unit A shown in FIG. 1.

A detailed schematic drawing of the MAC 1 (FIG. 1) is shown in FIG. 2 including FIG. 2A through FIG. 2D. In addition, a detailed schematic drawing of the peripheral unit A is shown in FIG. 3. The peripheral unit A shown in FIG. 3 is exemplary of the peripheral units B and C. It should be noted, however, that the peripheral device 112 (FIG. 3) may differ for the different peripheral units. The peripheral device 112 is not important to this invention and may be any data source, such as a disk or a drum, which requires communication from time to time with a memory unit M (FIG. 1). The construction and operation of peripheral devices such as device 112 are well known. An example of a peripheral device which might illustratively be used in connection with the present invention is a type 251 magnetic drum memory available from the Digital Equipment Corporation, Maynard, Massachusetts. This device is capable of operating in a mode called the data break mode in which data is exchanged directly between the device and memory location specified by the device. Both the drum memory and the data break mode of operation are more fully described in the *Small Computer Handbook*, 1967 Edition, published by the Digital Equipment Corporation, Maynard, Mass. Certain particular characteristics of these devices required for this illustrative embodiment of the peripheral units will be discussed below.

PERIPHERAL UNIT

Before discussing in detail the MAC (FIG. 2), a brief discussion of the typical peripheral unit A (FIG. 3) will be presented. It is assumed that the peripheral device 112 generates the signal JOB = "1" to indicate that it requires access to a memory M (FIG. 1). If a memory M is to be accessed for the purpose of writing data from the peripheral device 112 (FIG. 3) into the memory M (FIG. 1), the peripheral device simultaneously loads the data into the write register 113 (FIG. 3). In addition, irrespective of whether the memory access is required for reading or writing, the address of the memory M (FIG. 1) to be accessed is simultaneously loaded into the address register 114 (FIG. 3).

Figure 4:
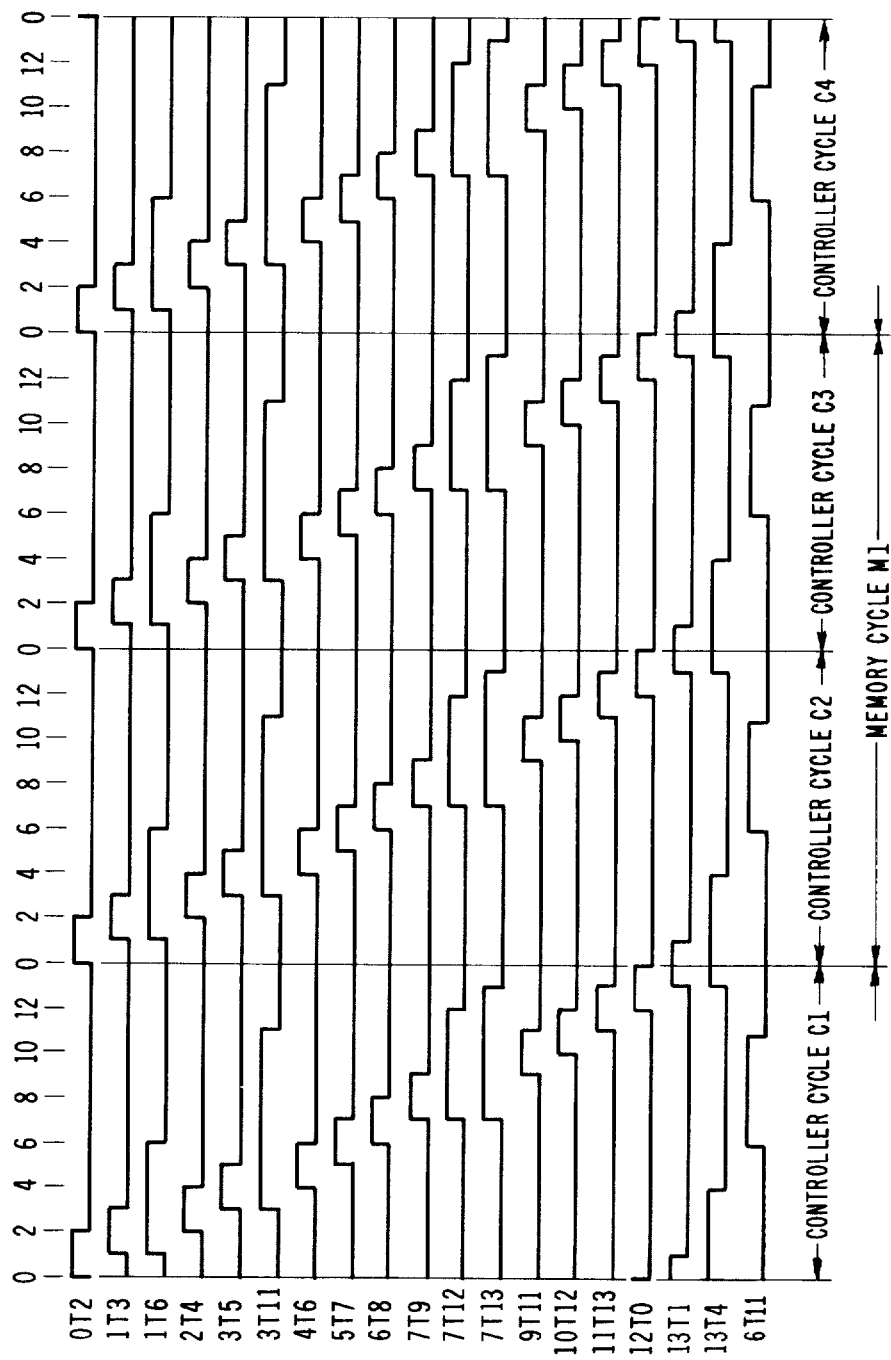
FIG. 4 shows a representation of timing signals generated by the clock shown in FIG. 1.

Assuming further that the flip-flop MAPP (FIG. 3), which will be discussed in more detail below, is reset, the signal MAPP, appearing at the Q output of the MAPP flip-flop, is equal to 1. Both the signals JOB = 1 and MAPP = 1 are applied to inputs of the AND gate 106. The final signal applied to the AND gate 106 is the timing signal 1T3. This timing signal is generated by the clock 3 (FIG. 1) and is shown in FIG. 4. When the timing signal 1T3 = 1 (FIG. 3) occurs, a 1 signal appears at the output of the AND gate 106. This 1 signal at the output of the AND gate 106 is the previously mentioned signal REQA. Thus, as a result of the generation by the peripheral device 112 of the signal JOB = 1 simultaneously with the flip-flop MAPP being reset and the occurrence of the timing signal 1T3 = 1, the signal REQA = 1 (FIG. 1) is generated and sent to the MAC 1. It is important to note that as long as the signal JOB (FIG. 3) remains equal to 1 and the flip-flop MAPP remains reset, the signal REQA = 1 (FIG. 1) is generated with each occurrence of the signal 1T3 = 1 (FIG. 4).

Since it was assumed that the peripheral unit A (FIG. 3) is the highest priority peripheral unit, it will receive the signal ENA = 1 (FIG. 1) from the MAC 1 after the generation of the signal REQA = 1. It should be noted, however, that even if the peripheral unit A (FIG. 3) were not the assumed highest priority unit, it could still receive the signal ENA = 1 (FIG. 1) if it happened to be the highest priority peripheral unit requesting memory access at the particular request time. This will be explained in greater detail, however, in connection with the detailed discussion of the MAC (FIG. 2).

The signal ENA = 1 (FIG. 3) is applied to an input of the AND gate 103. The timing signal 7T12 (FIG. 4) is applied to the other input of the AND gate 103 (FIG. 3). As a result, if during the interval in which the timing signal 7T12 (FIG. 4) is equal to 1, the signal ENA = 1 (FIG. 3) is applied to the AND gate 103, the AND gate 103 generates a 1 signal at its output which is applied to the S input of the flip-flop ENP. As a further result, the flip-flop ENP becomes set and generates the signal ENP = 1 at its Q output, which signal is applied to an input of the AND gate 107 and to an input of the AND gate 104. Flip-flops ENP, ENP1, MAPP, MAP1, and MAP2 comprise a timing chain of sequencer. Each flip-flop is sequentially set in response to the previous flip-flop being in the set position in conjunction with the proper timing signal. the sequencer comprised of flip-flops ENP through MAP2 controls and synchronizes the operation of the peripheral unit and allows the unit to operate in a semiautonomous fashion. As will be described hereafter, the sequencer, after having been started by the signal ENA = 1 will disable the generation of access requests by AND gate 106 after a predetermined interval. During this predetermined interval, one subsequent request is generated as described below. The other input of the AND gate 107 is driven by the timing signal 13T1 (FIG. 4). Thus, when the timing signal 13T1 becomes equal to 1, the AND gate 107 (FIG. 3) applies a 1 signal to the AND gates 100. This 1 signal enables the AND gates 100 to apply the contents of the previously mentioned address register 114 to the PU address bus for transmission to the MAC 1 (FIG. 1).

It will be recalled that the signal ENP = 1 from the flip-flop ENP is applied to an input of the AND gate 104. The other input of the AND gate 104 is driven by the timing signal 0T2 (FIG. 4). As a result, when the timing signal 0T2 becomes equal to 1, the AND gate 104 (FIG. 3) applies a 1 signal to the S input of the flip-flop ENP1. The flip-flop ENP1, therefore, becomes set. The resulting 1 signal, ENP1 = 1, at the Q output of flip-flop ENP1 is applied to inputs of the AND gates 105, 109, ad 121. It should be noted that the flip-flop ENP is reset by the subsequent occurrence of the timing signal 5T7 = 1 (FIG. 4). One of the other inputs of the AND gate 109 is driven by the signal WRT. When the signal WRT is equal to 1 a write operation is indicated. More specifically, the signal at the output of the address register 114 which drives the AND gate 100b specifies whether the operation to be performed in accessing the selected memory M (FIG. 1) is a read operation or a write operation. If that output of the address register 114 (FIG. 3) is a 0 signal, a write operation is indicated. This signal is applied to the inverter 110 producing the signal WRT = 1. Thus, if the access operation is a write operation, the signal WRT = 1 is applied to the AND gate 109. As a result, when the timing signal 6T8 (FIG. 4), which is applied to the final input of the AND gate 109 (FIG. 3), becomes equal to 1, a 1 signal is generated at the output of the AND gate 109 which is applied to the AND gates 101. As a result, the previously mentioned data stored in the write register 113 in conjunction with the write operation are gated by the AND gates 101 to the PU reply bus for application to the MAC 1 (FIG. 1).

It will be recalled that the signal ENP1 = 1 at the Q output of the flip-flop ENP1 is also applied to an input of the AND gate 105 which, in turn, drives the S input of the flip-flop MAPP. However, until the timing signal 5T7 (FIG. 4) which is applied to the other input of the AND gate 105 (FIG. 3) becomes equal to 1 the flip-flop MAPP remains reset. Moreover, the signal JOB remains equal to 1 until the device 112 receives an indication that its required accessing operation has been completed. Therefore, with the occurrence of the timing signal 1T3 = 1 (FIG. 4), before the signal 5T7 becomes equal to 1, the aforementioned signal REQA = 1 is generated once again. Thus, two pulses of the signal REQA have been produced coincident with the consecutive occurrences of the timing signal 1T3 = 1 (FIG. 4). The significance of this will become apparent below. It should be noted though that the flip-flop MAPP becomes set at the time 5T7 becomes equal to 1 and consequently only two pulses of the signal REQA are generated. To generate additional REQA pulses, the flip-flop MAPP must be reset.

As mentioned above, one of the inputs of the AND gate 121 (FIG. 3) is driven by the signal ENP1 = 1. The other inputs of the AND gate 121 are driven by the signal BLOCK, to be described below, and the timing signal 7T12 (FIG. 4), respectively. Therefore, if during the time in which the Q output of the flip-flop ENP1 (FIG. 3) is equal to 1 and the timing signal 7T12 (FIG. 4) is equal to 1, the signal BLOCK = 1 is received from the MAC 1 (FIG. 1), a 1 signal is generated at the output of the AND gate 121 (FIG. 3) which is applied to the R input of the flip-flop MAPP through the OR gate 119. As a result, the flip-flop MAPP becomes reset, generating the signal MAPP = 1. The signal MAPP = 1 again enables the AND gate 106 to generate the signal REQA = 1 at the next occurrence of the signal 1T3 = 1 (FIG. 4).

Assuming the BLOCK = 1 signal is not received, the flip-flop MAPP remains set, generating the signal MAPP = 1 until the timing signal 3T5, which is applied to the other input of the OR gate 119, becomes equal to 1. The MAPP = 1 (FIG. 3) signal is applied to the AND gate 116. As a result, when the timing signal 1T3 which is applied to the other input of the AND gate 116 becomes equal to 1, just before the signal 3T5 becomes equal to 1, the AND gate 116 generates a 1 signal which sets the flip-flop MAP1. The signal MAP1 = 1 is thus produced. This signal is applied to the peripheral device 112 to signal that the desired operation will be executed. Therefore, in the case of a write operation by the peripheral device 112 (FIG. 3) the data previously sent on the PU reply bus to the MAC 1 (FIG. 1) will be applied by the MAC 1 to the memory M specified by the address previously supplied on the PU address bus. In the case of a read operation the signal MAP1 = 1 (FIG. 3) for the peripheral unit A indicates that the memory M (FIG. 1) specified by the previously supplied address from the address register 114 (FIG. 3) will subsequently reply with data on the PU write bus to the AND gates 102.

To enable the AND gates 102 at the appropriate time when data should be received by them, the MAP1 = 1 signal is delayed for one controller cycle by the flip-flop MAP2 before it is applied to the AND gate 115. The other inputs of that AND gate are the signals WRT and 13T4 (FIG. 4). Consequently, if the signal WRT is equal to 1, indicating that the previously mentioned signal from the address register 114 (FIG. 3) specifies a read operation, simultaneously with the occurrence of the timing signal 13T4 = 1 (FIG. 4) and the signal MAP2 = 1 (FIG. 3), the AND gates 102 are enabled to gate the data appearing on the PU write bus into the reply register 111. In addition, the peripheral device 112 is apprised of the presence of data in the register 111. Subsequently, with the occurrence of the timing signal 6T8 = 1 (FIG. 4) which is applied to the AND gate 108 (FIG. 3) along with the signal MAP2 = 1, signal JBF = 1 is generated and applied as a clear signal to the address register 114, the reply register 111 and the write register 113.

As was noted above, the MAP1 = 1 signal is also applied to the peripheral device 112. This signal is used to indicate to the peripheral device 112 that the requested memory accessing is being permitted by the MAC 1 (FIG. 1). As a result, the peripheral device 112 (FIG. 3) generates the signal JOB = 0 until such as it requires access again to a memory M (FIG. 1). Consequently, no additional request signals, REQA = 1, are generated.

Thus, from the above discussion, it should be observed that the typical peripheral unit A generates a plurality of signals REQA = 1 requesting use of the PU bus when it requires access to a memory unit. More specifically, a request for PU bus use signal, REQA = 1, is sent by the peripheral unit A on a private line to the MAC 1 (FIG. 1) once each controller cycle without waiting for a determination of the result of the preceding REQA = 1 signal. If an enable signal is received by the peripheral unit in response to a request signal, one additional request is dispatched by the peripheral unit to the MAC 1. In addition, address and data signals are also applied to appropriate buses for transmission to the MAC 1. If a BLOCK signal is then received by the peripheral unit, indicating that no peripheral unit will be permitted to complete a data communication during the expected time interval, the peripheral unit returns to transmission of request signals.

MEMORY ACCESS CONTROLLER

Having above discussed the operation of the typical peripheral unit A, attention is now turned to the detailed discussion of the operation of the MAC (FIG. 2). It will be recalled that each peripheral unit generates a request signal when it requires access to a memory. The request signals REQA, REQB, and REQC from the peripheral units A, B, and C, respectively, are applied to the AND gates 40 (FIG. 2B). For purposes of illustration it is assumed that the request signals REQA (FIG. 1) and REQB are both equal to 1 and the request signal REQC is equal to 0, indicating that the peripheral units A and B require a memory access and the peripheral unit C does not. When the timing signal 1T6 = 1 (FIG. 4) occurs, the gates 40 (FIG. 2B) are enabled to apply the request signals above described to the request register 39. The request register 39 contains one register stage or cell for each peripheral unit. In this case, for the assumed illustrative embodiment, the request register 39 contains three stages. The signals appearing at the outputs of the AND gates 40 thus determine the state of the three stages, respectively.

The three outputs of the request register 39 are applied to the priority circuit 46 (FIG. 2D) and the priority — 1 circuit 58. The priority circuit 46 generates, at one of its three outputs, a 1 signal corresponding to the highest priority peripheral unit having a request signal stored in the request register 39 (FIG. 2B). In fact, the cells or stages of the register 39 are arranged in an order priority depending upon the connections made to the circuits 46 and 58 (FIG. 2D). In this case the priority circuit 46 generates a 1 signal which is applied to the one input of the AND gates 44a and 60a since the peripheral unit A has stored a request signal in the highest priority stage of the request register 39 (FIG. 2B). Consequently, the other outputs of the priority circuit 46 (FIG. 2D) are both equal to 0. These outputs are applied, respectively, to inputs of the AND gates 44b and 60b and the AND gates 44c and 60c.

As mentioned above, the outputs of the request register 39 (FIG. 2B) are also applied to the priority — 1 circuit 58. Specifically, the outputs of the register 39 are applied, respectively, to inputs of the AND gates 57a, 57b, and 57c (FIG. 2D). It is the function of the priority — 1 circuit 58 to generate on one of its three outputs a 1 signal corresponding to the peripheral unit which has stored a request signal in the highest priority stage of the request register 39 (FIG. 2B) excluding the stage associated with the peripheral unit enabled as a result of the preceding set of service requests. It is here assumed that, for purposes of illustration, no peripheral unit was enabled during the preceding request sequence. Therefore, as will become clear in the subsequent discussion, the enable register 64 (FIG. 2D) is cleared and all of its outputs, which are, respectively, applied to the inverters 66a, 66b, and 66c, are equal to 0. As a result the outputs of the inverters 66 are all equal to 1. It can be seen in FIG. 2B that these outputs are applied, respectively, to inputs of the AND gates 57a, 57b, and 57c (FIG. 2D). Since both of the inputs of the AND gate 57a are, thus, equal to 1, the output of the AND gate 57a is equal to 1 and the output of the inverter 59a which is responsive to the output of AND gate 57a is equal to 0. Consequently, the outputs of AND gates 57b and 57c are both equal to 0 in response to the 0 signal from the inverter 59a. Thus, only the output of the priority — 1 circuits 58 corresponding to the output of the AND gate 57a is equal to 1. The outputs of the priority — 1 circuit 58 are applied respectively to inputs of the AND gates 45 and 61.

From the above discussion it should be observed that the priority circuit 46 generates a 1 signal corresponding to the peripheral unit of highest priority which has stored a request signal in the register 39 (FIG. 2B). The priority — 1 circuit 58 (FIG. 2D) generates a 1 signal output corresponding to the highest priority peripheral unit which has stored a request signal in the request register 39, excluding the peripheral unit identified by the signals stored in enable register 64. The output signals from the two circuits are, respectively, applied to sets of AND gates which, as will be seen below, are selectively enabled to gate these signals as a group to their respective outputs.

All of the AND gates 44 are driven by the signal $\overline{GO-PU}$ and the AND gates 45 are driven by the signal GO-PU. It is the signal GO-PU = 1 which indicates that a priorly enabled peripheral unit is to be permitted to complete its required memory access. Assuming the signals GO-PU = 0 and $\overline{GO-PU}$ = 1, the AND gates 44 are enabled when the timing signal 7T9 becomes equal to 1. Consequently, the 1 signal applied to AND gate 44a by priority circuit 46 is applied to an input of OR gate 56a while 0 signals are applied respectively by the AND gates 44b and 44c to inputs of the OR gates 56b and 56c. As a result, the OR gate 56a generates the signal ENA = 1 which has been discussed above and the OR gates 56b and 56c, respectively, generate the signals ENB = ENC = 0. In addition, a 1 signal is also applied by the AND gate 44a to an input of the OR gate 52a. As a result, a 1 signal is applied by the OR gate 52a to the S input of the flip-flop ENS and to an input of the OR gate 53. Consequently, the flip-flop ENS becomes set and the OR gate 53 generates the signal EN = 1 which sets the flip-flop EN1. The set flip-flop EN1 generates the signal EN1 = 1 at its Q output. This signal is applied to an input of the AND gate 54, the other input of which is driven by the timing signal 11T13 (FIG. 4). Thus, when 11T13 becomes equal to 1, the AND gate 54 (FIG. 3) generates a 1 signal, which is applied to inputs of the AND gates 60 and 61. The AND gates 60 are also driven by the signal ENS = 1 appearing at the Q output of the flip-flop ENS. As a result, the AND gates 60 are fully enabled to gate the signals at the output of the priority circuit 46 through the OR gates 65 to the enable buffer 62. There, those signals are stored.

It should be noted here that all of the operations just described occur during what will be referred to as controller cycle C1 (FIG. 4) of a request sequence. It should be noted that this controller cycle designation merely serves to provide a reference for observing the timing of events in the controller. The controller cycle C1 should not be taken as literally being the first controller cycle; other controller cycles may precede controller cycle C1 (FIG. 4). More specifically, the generation of request signals occurs during the interval in which 1T3 is equal to 1 in the controller cycle C1. These signals propagate to the MAC (FIG. 2) and are received by the MAC in the interval in which the signal 1T6 (FIG. 4) is equal to 1 during the controller cycle C1. These signals are processed by the MAC (FIG. 2) and enable signals are generated by the MAC in the interval in which 7T9 (FIG. 4) is equal to 1 during controller cycle C1. The enable signals propagate to the appropriate peripheral units and are received in the terminal in which 7T12 is equal to 1 during the controller cycle C1.

In response to the enable signal, ENA = 1 (FIG. 1) in the assumed example, the peripheral unit A (FIG. 3) gates address data, as above described, to the PU address bus in the interval when 13T1 (FIG. 4) is equal to 1 during the transition from controller cycle C1 to controller cycle C2. For a memory write operation, the peripheral unit A (FIG. 3) also gates write data to the PU reply bus in the interval when 6T8 (FIG. 4) is equal to 1 during the controller cycle C2. The address data are received by the MAC (FIG. 2) in the interval when 13T4 (FIG. 4) is equal to 1 during the transition from controller cycle C1 to controller cycle C2 and are gated into the address buffer register 69 (FIG. 2C). The write data are received by the MAC (FIG. 2) in the interval when 6T11 (FIG. 4) is equal to 1 during the controller cycle C2 and are gated into the reply register 153 (FIG. 2B). Whether or not this address and write data are transmitted to the appropriate memory depends on whether there is a conflict with the memory bus needs of the CPU 2 (FIG. 1). Attention is, therefore, turned to the determination of such conflicts and their resolution.

The CPU 2 (FIG. 1) may be any central processing unit requiring periodic access to memory. When the CPU 2 requires access to one of the memories M, it generates the signal CPU ACCESS = 1. This signal is applied to one input of the AND gate 81 (FIG. 2C). The other input of that AND gate is the signal $\overline{\text{STOP-CPU}}$ which, for illustrative purposes, will be assumed here to be equal to 1. As a result, the AND gate 81 generates a 1 signal and enables the AND gates 26. The outputs of the AND gates 26, thus, reflect the signals appearing at their respective inputs from the CPU address bus. In particular, the output of the AND gate 26a, reflecting the most significant bit in the address, indicates which of the memory buses, B0 or B1, is required for the CPU access. If the output of the AND gate 26a (IFG. 2B) is equal to 1, the memory bus B1 is required; otherwise, the memory bus B0 is required. The output signal of AND gate 26a is applied to AND gates 31 to gate the remaining portions of the address to the B1 address bus when that bus is required for CPU memory accessing. It is also applied to the AND gates 80a and 85a as will be described below. The output signal of AND gate 26a is also inverted in inverter 94 (FIG. 2C), and applied to AND gates 80b and 85b and to AND gates 32 to gate address data, when appropriate, to the B0 address bus.

The respective other inputs of the AND gates 80a and 80b are driven by the CPU ACCESS signal. The resulting output signals CPU-B1 are equal to 1 when CPU 2 (FIG. 1) requires access via the B1 bus or the B0 bus, respectively. These signals are each inverted in the inverters 75a and 75b (FIG. 2C) and applied, respectively, to inputs of the AND gates 77a and 77b. Here these two signals are individually combined with signals indicating the memory bus required for the accessing operation associated with the address data stored for the enabled peripheral unit A (FIG. 3) in the address buffer register 69 (FIG. 2C). Specifically, the signal PU-B1 reflects the most significant bit of the address stored in the register 69 and thus indicates the memory bus required. This signal and its inverted version PU-B0 from the inverter 86 gate the stored address data to the B1 address bus through the AND gates 29 or the B0 address bus through the AND gates 30, as appropriate. In addition, as mentioned above, these signals are logically combined, respectively, in the AND gates 77a and 77b with signals $\overline{\text{CPU-B1}}$ and $\overline{\text{CPU-B0}}$ from the inverters 75a and 75b. If either of these AND gates generates a 1 signal, there is no conflict between the bus needs of the CPU 2 (FIG. 1) and the peripheral unit A. If neither generates a 1 signal, there is a conflict.

Assuming there is no conflict and one of the AND gates 77a or 77b (FIG. 2C) generates a 1 signal, the OR gate 79 generates a 1 signal which is applied to an input of the AND gate 84. One of the other inputs of the AND gate 84 is driven by the signal EN2 (FIG. 2D). This signal is the Q output of the fliip-flop EN2 which is driven by the signal EN1 through the AND gate 55. As we seen above, the flip-flop EN1 was set during the controller cycle C1, reflecting the transmission of an enable signal to a peripheral unit. Consequently, with the occurrence of the signal 3T5 = 1 (FIG. 4) in the controller cycle C2, the flip-flop EN2 (FIG. 2D) is also set. Therefore, the signal EN2 = 1 is applied to the AND gate 84 (FIG. 2C).

The final input of the AND gate 84 is driven by the inverter 76. The signal appearing at the output of the inverter 76 will be discussed in more detail below. Suffice it here to say that the output signal of inverter 76 prevents the use of a memory bus if the particular bus is still busy from a prior accessing operation. Assuming that such is not the case here, the signal applied by the inverter 76 to the final input of the AND gate 84 is equal to 1. Consequently, the AND gate 84 generates a 1 signal which is applied to the S input of the flip-flop GO-PU, setting that flip-flop.

With the setting of the flip-flop GO-PU, the signal GO-PU = 1 is generated which indicates that the currently enabled peripheral unit A is to be permitted to complete its memory accessing operation. Consequently, this signal is applied to the inverter 50 which generates the signal $\overline{\text{GO-PU}}$=0 and which applies that signal to an input of the AND gate 41. As a result, the signal BLOCK = 0 is generated, indicating that the enabled peripheral unit A is being permitted to complete its required memory access operation.

The signal GO-PU = 1 (FIG. 2C) also enables the AND gates 28 to supply the address data stored in the address buffer register 69 to the AND gates 29 and 30. As a result, when the timing signal 5T7 (FIG. 4) becomes equal to 1 in controller cycle C2, the address data are gated to the appropriate B0 or B1 bus (FIG. 2A) by the AND gates 29 or 30 (FIG. 2C).

In addition, the signal GO-PU = 1 is applied to the AND gate 78a (FIG. 2C) and through it, when timing signal 12TO (FIG. 4) equals 1, to the S input of the flip-flop GO-PU1 (FIG. 2C). As a result, the flip-flop GO-PU1 becomes set and a 1 signal is applied to an input of the AND gate 78b. Thereafter, when timing signal 6T8 (FIG. 4) equals 1 in controller cycle C3, a 1 signal is generated by the AND gate 78b (FIG. 2A) and applied to the S input of the flip-flop GO-PU2. Consequently, the flip-flop GO-PU2 becomes set. It should be recognized that the flip-flops GO-PU1 and GO-PU2 merely provide delay for the signal GO-PU = 1.

The signal GO-PU1 = 1 is also applied to an input of the AND gate 92 (FIG. 2B). The outer input of that AND gate is the signal RDP which is equal to 1 if the data stored in the address buffer register 69 (FIG. 2C) specify a write memory operation. More specifically, if the particular bit of the data stored in the address buffer register 69 driving the AND gate 28b is equal to 0, data from the peripheral unit A (FIG. 3) are stored in the reply register 153 (FIG. 2B) for ultimate storage in the appropriate memory M (FIG. 1). If that is the case, the signal RDP at the output of the inverter 83 (FIG. 2C) is equal to 1 coincident with the signal GO-PU1 = 1 from the GO-PU1 flip-flop. Thus, the AND gates 34 (FIG. 2B) are enabled by the 1 signal generated by the AND gate 92 and they apply the data stored in the reply register 153 to inputs of the AND gates 37 and 38. The AND gates 37 are also driven by the signal PU-BO1. That signal appears at the Q output of the flip-flop PU-BO1 and is a delayed version of the previously discussed signal PU-BO. Similarly, the AND gates 38 are all driven by the signal $\overline{\text{PU-BO1}}$. Thus, depending upon the memory bus specified by the peripheral unit in its addressing data, the data supplied by the peripheral unit are gated by the appropriate AND gates 37 or 38 to the BO or the B1 write bus when the timing signal 13T1 (FIG. 4) becomes equal to 1 during the transition from controller cycle C2 to the controller cycle C3.

If the operation specified by the data stored in the address buffer register 69 (FIG. 2C) is a read from memory operation rather than a write to memory operation, a 1 signal appears at the particular output of the address buffer register 69 which drives the AND gate 28b. This 1 signal is applied to the AND gate 82a and sets the flip-flop RW1 when the timing signal 9T11 becomes equal to 1 in the controller cycle C2. The 1 signal at the Q output of the RW1 flip-flop is applied to an input of the AND gate 82b. As a result, the flip-flop RW2 is set when the signal 4T6 becomes equal to 1 in the controller cycle C3 (FIG. 4). Thus, both input signals to the AND gate 73 (FIG. 2A), the GO-PU2 signal at the Q output of the previously mentioned GO-PU2 flip-flop, and the RW2 signal at the Q output of the flip-flop RW2, are equal to 1 during the controller cycle C3. Consequently, data applied to the AND gates 24 are gated by the 1 signal from AND gate 73 into the write register 68. Subsequently, the data are also gated to the PU write bus by the AND gates 25 when the signal 13T1 becomes equal to 1 during the transition from controller cycle C3 to C4 (FIG. 4).

The particular data signals that are gated by the AND gates 24 (FIG. 2A) to the register 68 are determined by which of the sets of AND gates 22 or 23 is enabled by the outputs of the flip-flop PU-BO2. The outputs of that flip-flop are delayed versions of the outputs of the flip-flop PU-BO1. Consequently, when data are received from either the BO or the B1 reply bus, the appropriate data are gated into the write register 68 and to the PU write bus.

It should be noted that the signal GO-PU = 1 is also applied in controller cycle C2 to the AND gates 45 (FIG. 2D) partially enabling them to gate the signals appearing at the outputs of the priority — 1 circuit 58 to inputs of the OR gates 56, described above. As indicated above, the particular signals appearing at the outputs of the priority — 1 circuit 58 are dependent upon the signals currently stored in the enable register 64 and the request register 39.

More specifically, it will be recalled that during the controller cycle C1, the signals appearing at the outputs of the priority circuit 46 were gated through the AND gates 60 and the OR gates 65 into the enable buffer 62. Thus, the signals appearing at the outputs of the OR gates 65 and stored in the buffer 62 were, respectively, 1 for OR gates 65a, 0 for OR gate 65b, and 0 for OR gate 65c. When the timing signal 2T4 (FIG. 4) becomes equal to 1 in the controller cycle C2, the data stored in the enable buffer 62 (FIG. 2D) are transferred through the AND gates 63 to the enable register 64. Consequently, the signals appearing at the outputs of inverters 66 are, respectively, 0 for inverter 66a, 1 for inverter 66b, and 1 for inverter 66c.

Moreover, the contents of the request register 39 during controller cycle C2 reflect the second request signal REQA = 1 transmitted by the peripheral unit A. If the other peripheral units, which are not enabled, transmit the same request signals as previously transmitted during controller cycle C1, the request register 39 receives and stores the same act of signals as received and stored in controller cycle C1, even though peripheral unit A was enabled during controller cycle C1. As a result, the signals applied by the register 39 to inputs of the AND gates 57 are, respectively, 1 for AND gate 57a, 1 for AND gate 57b, and 0 for AND gate 57c. In response to these signals and those mentioned above from inverters 66, the priority — 1 circuit 58 generates a 1 signal on its output corresponding to both the output of the AND gate 57b and the peripheral unit B. Thus, even though the peripheral unit A transmitted a second request signal REQA = 1, that request signal is not reflected at the outputs of the priority — 1 circuit 58. This is because the peripheral unit A was permitted to complete its request accessing operation. As will be seen below, such is not the case if the peripheral unit A is not permitted to complete its requested operation.

The 1 signal at the output of the AND gates 57b is gated through the AND gate 45b to the OR gate 56b in response to the signal GO-PU = 1, as described above. As a result, the signal ENB = 1 is generated and transmitted to the peripheral unit B. Also, since the outputs of the AND gates 45 are applied to inputs of the OR gate 52b, that gate generates a 1 signal also. The 1 signal produced by OR gate 52b resets the flip-flip ENS and causes the OR gate 53 to generate the previously discussed signal EN = 1 which sets the flip-flop EN1. As above described, this results in the generation of a 1 signal by the AND gate 54 when the timing signal 11T13 becomes equal to 1. This signal together with the signal $\overline{\text{ENS}} = 1$ at the $\overline{Q}$ output of the flip-flop ENS enables the AND gates 61 to gate the outputs of the priority — 1 circuit 58 through the OR gates 65 into the enable buffer 62.

The above has described the operation of the memory access controller (FIG. 2) when an enabled peripheral unit, specifically peripheral unit A (FIG. 1), is permitted to complete its required memory access operation. More specifically, the above described operation is that of the memory access controller (FIG. 2) in the absence of a conflict between the bus requirements of the enabled peripheral unit and those of the CPU 2 (FIG. 1). If, however, a conflict does exist, the operation of the MAC is substantially changed.

More specifically, if after having enabled the peripheral unit A during controller cycle C1 (FIG. 4), a conflict arises between the CPU bus requirements and those of the enabled peripheral unit, the flip-flop GO-PU (FIG. 2C) is not set as it was in the prior discussion. Moreover, with the occurrence of the signal 7T9 = 1 (FIG. 4) in the controller cycle C2, the AND gate 72 (FIG. 2A) to which the signal EN2 = 1, previously discussed, is applied, generates a 1 signal which is applied to the trigger (t) input of the flip-flop C1 in the counter 67. As a result, the counter 67 increments its count to 1. The significance of this counter lies in the fact that when the counter reaches the count of 3, the flip-flop STOP-CPU becomes set and signals are transmitted to the CPU 2 (FIG. 1) to halt the operation of the CPU 2. These signals are in the nature of interrupts to permit a peripheral unit to use its required memory bus. They serve to prevent monopolization of a particular memory bus by the central processing unit to the exclusion of all peripheral units.

In addition to the counter 67 (FIG. 2A) assuming the count of 1, the request register 39 (FIG. 2B) also receives in controller cycle C2 the second set of request signals above described. More specifically, it should be recalled that the peripheral unit A (FIG. 3) produces a second request signal in the controller cycle C2 and transmits it to the MAC (FIG. 2) even though it has not yet been apprised, by means of BLOCK signal, of the results of its initial request signal. The other peripheral units B and C (FIG. 1) also repeat their respective request signals, as well. Consequently, a signal REQA = 1 along with the signals REQB = 1 and REQC = 0 are received in the controller cycle C2 and stored in the request register 39 (FIG. 2D).

Since the peripheral unit A is the highest priority peripheral unit, priority circuit 46 generates a 1 signal on its output driving AND gate 44a and 0 signals on its other outputs. Priority — 1 circuit 58, however, generates a 1 signal on its output corresponding to the output of the AND gate 57b and 0 signals on its other outputs. This is due to the fact that the enable register 64 contains the priorly stored signals reflecting the enable signal previously sent to the peripheral unit A in the controller cycle C1. Moreover, since the signal GO-PU is equal to 0 in view of the conflict, the inverter 50, to which the signal GO-PU = 0 is applied, generates a 1 signal at its output. Consequently, the AND gates 44 gate the signals appearing at the outputs of the priority circuit 46 to the OR gates 56 and the OR gate 56a generates the enable signal ENA = 1. Thus, the peripheral unit A is enabled again. In addition, the signals appearing at the outputs of the AND gates 44 are applied to the OR gate 52a and through that gate to the S input of the flip-flop ENS and an input of the OR gate 53. As a result, the signal EN = 1 is generated by the OR gate 53 and the flip-flops ENS and EN1 become set. The remaining operations are as described above when the peripheral unit A was enabled the first time with the addition that signal BLOCK = 1 is generated.

More specifically, the signal $\overline{\text{GO-PU}}$ = 1 is applied to an input of the AND gate 41. The other signals applied to inputs of that gate are the signals EN2 and the timing signal 7T9. As will be recalled, the flip-flop EN2 becomes set when the timing signal 3T5 becomes equal to 1 following the setting of the flip-flop EN1. Thus, the flip-flop EN2 is set during controller cycle C2 in response to the previous setting of the flip-flop EN1 in controller cycle C1. Consequently the signal EN2 = 1 is applied to one input of the AND gate 41. Thus, when the timing signal 7T9 becomes equal to 1 in the controller cycle C2, the signal BLOCK = 1 is generated and set to all peripheral units. This signal notifies all peripheral units that any use of the memory buses by the peripheral unit which was enabled during controller cycle C1 is preempted.

Since it was assumed above that there is a conflict in the controller cycle C2 between the CPU 2 (FIG. 1) bus requirements and the peripheral unit A bus requirements, it is important to note that the CPU ACCESS = 1 signal and the CPU address information on the CPU address bus are only present throughout the controller cycle C2 (FIG. 4). However, the assumed memory cycle length is twice that of a controller cycle. Thus, any use of the memory bus by the CPU 2 (FIG. 1) or a peripheral unit requires two controller cycles. Consequently, since there is a conflict, as observed above, for controller cycle C2, there must also be a conflict for controller cycle C3 unless the bus required for peripheral unit use changes. To determine the existence of such a continuing conflict for the controller cycle C3, it is necessary to have stored data indicating which of the memory buses was used in controller cycle C2.

As was mentioned earlier, the signal at the output of the AND gate 26a, indicating the memory bus required by the CPU 2 (FIG. 1), is applied to an input of the AND gate 85a. The logical complement of that signal is applied to an input of the AND gate 85b. Moreover, both of the AND gates 85a and 85b are driven by the CPU ACCESS signal and the timing signal 11T13. Thus, when the CPU ACCESS signal equals 1 simultaneously with the signal 11T13 = 1 in the controller cycle C2, the signals at the outputs of the AND gate 26a and the inverter 94 are gated to the S inputs of the flip-flops CPU-B11 and CPU-BO1, respectively. As a result, if the CPU 2 (FIG. 1) requires the memory bus B1, the flip-flop CPU-B11 becomes set; otherwise the flip-flop CPU-BO1 becomes set. When the signal 6T8 becomes equal to 1 in the controller cycle C3, the signals at the Q outputs of these two flip-flops are gated through the AND gates 91a and 91b, respectively, to the S inputs of the flip-flops CPU-B12 and CPU-BO2. As a result these flip-flops become set in correspondence with the applied signals. The signals CPU-B12 and CPU-BO2 appearing respectively at the Q outputs of aforementioned flip-flops are used in gating data on the B1 reply bus through the AND gates 21 or data on the BO reply bus through the AND gates 20 to the CPU reply bus when the timing signal 7T13 becomes equal to 1 in the controller cycle C3.

The signals CPU-B11 and CPU-BO1 are also applied respectively to inputs of the AND gates 87a and 87b. The respective other inputs of these gates are driven by the signals PU-B1 and PU-B0. Thus, for example, if during the controller cycle C2, the CPU 2 (FIG. 1) begins to use the bus B1, the signal CPU-B11 = 1 is applied during the controller cycle C3 to the aforementioned input of AND gate 87a. If, also during the controller cycle C3 (FIG. 4) the currently enabled peripheral unit requires the use of bus B1, the signal PU-B1 = 1 is applied to the other input of the AND gate 87a and a 1 signal is generated at the output of AND gate 87a. this 1 signal indicates that there is a conflict because the bus B1 is still busy with the CPU access begun earlier and yet it is needed by the currently enabled peripheral unit. The 1 signal from gate 87a produces a 1 signal at the output of the OR gate 88. Consequently, the output of the inverter 76 is equal to 0. This, in turn, prevents the flip-flop GO-PU from being set with the results previously described.

The AND gates 87c and 87d perform a function similar to that of gates 87a and 87b except with respect to conflicts arising when a peripheral unit has begun to use a memory bus during the first half of a memory cycle. For example, if during the controller cycle C2, the then currently enable peripheral unit begins to use the bus B1, the signal $\overline{\text{PU-BO1}}$ = 1 is applied during the controller cycle C3 to an input of AND gate 87c together with the delayed GO-PU signal, GO-PU1 = 1. If, also during controller cycle C3, the peripheral unit enabled subsequent to the peripheral unit which is currently accessing memory, requires access by means of bus B1, the signal PU-B1 = 1 is applied to the other input of gate 87c. As a result, the gate 87c generates a 1 signal which, in turn, produces a 1 signal at the output of OR gate 88 and a 0 signal at the output of inverter 76. Consequently, the GO-PU flip-flop is not set and the latter enabled peripheral unit is not permitted to employ the bus B1 during controller cycle C3.

In addition, whenever a memory bus is busy with an accessing operation begun by a peripheral unit in the preceding controller cycle, a 1 signal is generated, as appropriate, by one of the AND gates 89a and 89b to indicate the particular busy memory bus. This 1 signal is applied to an input of the OR gates 90a and 90b. As a result, a STOP CPU BUS 1 signal or a STOP CPU BUS 0 signal, as appropriate, is sent to the CPU 2 (FIG. 1) to indicate that the particular bus is unavailable for CPU accessing.

It should be noted that copending application F. G. House, Ser. No. 476,436, filed June 5, 1974 now U. S. Pat. No. 3,967,246, discloses an invention similar in purpose to our invention.

What is claimed is:

1. A data processing system having a central processor, a plurality of peripheral units arranged in a preassigned priority, a plurality of memories accessible on request by said processor and said units and a memory access controller cooperating with said processor and said units to process conflicting access request for said memories, each one of said units comprising:
   timing means startable for generating a first, a second, a third, and a fourth timing signal, each timing signal being generated at a predetermined interval after the start of said timing means;
   means responsive to said first timing signal for forwarding to said controller an address designating one of said memories;
   means responsive to said second timing signal for sending data from said one unit to said controller; and
   means for repetitively generating access requests for said memories, said generating means being responsive to said third timing signal for stopping generation of said access requests;
   said memory access controller comprising: a first priority circuit responsive to a first set of access requests generated by said units for starting the timing means in a first unit with the highest priority request in said first set, said set including a single request generated by each unit desiring to access said memories; and
   means responsive to an address received from said first unit and to an address received from said processor for sending a blocking signal to stop the timing means in said first unit after said second timing signal is generated and before said third timing signal is generated when said processor and said first unit are requesting simultaneous access to the same memory.

2. A data processing system according to claim 1 further comprising a clock for generating stepping pulses and wherein said timing means comprises a plurality of bistable stages, means connecting each of said stages in a chain, said connecting means changing the state of each of said bistable stages in response to the change of state of a preceding one of said stages and to one of said stepping pulses, and means responsive to said blocking signal for preventing one of said stages from changing state.

3. A data processing system according to claim 1 wherein said memory access controller further comprises a second priority circuit responsive to a second set of access requests generated by said units, said second set including one subsequent request generated by said first unit, for indicating the requesting unit with highest priority in said second set of requests;
   means responsive to a selection of said first unit by said first priority circuit for inhibiting the response of said second priority circuit to said one subsequent request so that said second priority circuit indicates a second unit which has the highest priority in said second request set excluding said one subsequent request; and
   means responsive to an address received from said first unit and to an address received from said processor for starting the timing means in said second unit when said first unit and said processor request access to different memories.

4. A data processing system according to claim 3 further comprising:
   means in said unit responsive to said fourth timing signal for receiving data from one of said memories.

5. A peripheral unit for use in a data processing system having a central processor, a plurality of memories accessible by said processor and said unit and a memory access control including means for sending an enable signal to said unit when said unit requests access to said memories, means for determining memory access conflicts between said processor and said unit and means for sending a blocking signal to said unit for informing said unit of a conflict, said unit including:
   means for generating requests to access said memories and means for generating an address selecting one of said memories, wherein the improvement comprises:
   a sequencer startable in response to said enable signal for generating a first, a second, and a third timing signal, said signals being generated at predetermined intervals after the start of said sequencer;
   means responsive to said first timing signal for forwarding to said access control said address generated by said address generating means;
   means responsive to said second timing signal for formatting and forwarding to said access control information to be written into a selected one of said memories;
   means responsive to said blocking signal for stopping said sequencer only when said blocking signal is received at said unit within a predetermined time interval, said time interval occurring after said second timing signal is generated but before said third timing signal is generated; and
   means responsive to said third timing signal for disabling said generating means, said generating means generating one subsequent access request after said sequencer is started and before said second timing signal is generated.

6. A peripheral unit according to claim 5 further comprising a source of stepping pulses and wherein said sequencer comprises:
   a chain of bistable devices;
   means connecting each of said devices to change the state of each device in response to a change of state of a prior device in said chain and to one of said stepping pulses; and
   means responsive to said blocking signal for preventing one of said devices from changing state.

7. In a data processing system having a central processor, a peripheral unit, a memory, and a controller for selectively according said peripheral unit and said processor read and write access to said memory, the improvement comprising:

means in said peripheral unit for sending to said controller a first and a second access request signal each time said unit desires to obtain access to said memory, said second request signal being sent after said first request signal;

first means in said controller responsive to a request from either said processor or said peripheral unit for according the requesting one thereof access to said memory;

second means in said controller responsive to simultaneous requests from said processor and said unit for according said processor preferential access to said memory and for returning a blocking signal to said peripheral unit, said blocking signal not being receivable at said peripheral unit until after said second request signal has been sent to said controller;

means in said unit responsive to each reception of said blocking signal for sending an additional request signal to said controller; and means in said controller responsive to memory access being accorded to said unit in response to said first request signal for inhibiting said first according means and said second according means from responding to said second request signal.

8. In a data processing system, the improvement according to claim 7 further comprising:

means in said unit for receiving data from said memory after a predetermined time interval has elapsed from said sending of said second request signal; and means in said unit responsive to said blocking signal being received at said unit within said predetermined time interval for stopping said data receiving means from receiving data.

9. In a data processing system, the improvement according to claim 8 further comprising:

means in said unit responsive to the sending of said first request signal for transmitting data to said controller after said first request signal has been sent, but before a blocking signal has been received;

means in said controller responsive to data received from said unit for transferring said data to said memory; and means in said controller responsive to simultaneous memory access requests from said unit and said processor for preventing said transferring means from transferring said data.

10. In a data processing system, the improvement according to claim 9 further comprising:

a counter;

means responsive to each occurrence of simultaneous memory access requests from said processor and said memory for incrementing said counter; and means responsive to said counter reaching a predetermined count for preventing said second according means from according said processor access to said memory and from returning said blocking signal to said unit, whereby said processor is prevented from monopolizing access to said memory over said peripheral unit.

11. A memory access control for controlling information exchange between a plurality of memories, a processor, and a plurality of peripheral units, said units competing with each other and said processor for access to said memories, and each of said units being assigned a predetermined priority level and having means for repetitively generating access requests and means controllable for generating an address designating one of said memories, said control comprising:

means for repetitively receiving sets of access requests from said units, each of said sets including a single request from each unit which desires to access said memories;

first priority means responsive to a receipt of each set of requests for generating signals identifying a requesting unit with highest priority in that set;

second priority means responsive to a receipt of each set of requests for identifying a requesting unit with highest priority in that set;

means responsive to said signal for inhibiting said second priority means for responding to a second request from the highest priority unit identified by said first priority means in the immediately preceding request set;

first enable means responsive to the identification of a first highest priority unit by said first priority means for producing an enable signal to cause the controllable means in the first highest priority unit to generate a memory address; and second enable means responsive to the address generated by said first highest priority unit and to an address received from said processor for causing the controllable means in the second highest priority unit identified by said second priority means to generate a memory address when said addresses indicate requests by said processor and said first highest priority unit to access different memories.

12. A memory access control according to claim 11 wherein said second enable means comprises:

means responsive to the address generated by said first highest priority unit and to an address received from said processor for generating a go signal when said addresses indicate said first unit and said processor request access to different memories; and means responsive to said go signal and to an identification of a second highest priority unit by said second priority means for producing a control signal to cause said controllable means in the second highest priority unit to generate a memory address.

13. A memory access control according to claim 11 further comprising:

means responsive to said enable signal for generating a blocking signal after a predetermined time interval has elapsed, said blocking signal informing said first highest priority unit that said processor and said first highest priority unit request simultaneous access to the same memory; and means responsive to said go signal for stopping said blocking signal generating means from generating said blocking signal.

14. A memory access control according to claim 13 wherein said inhibiting means comprises:

storage means; and first gate means connected to said first priority means and responsive to said enable signal for gating the identity of said first highest priority unit into said storage means.

15. A memory access control according to claim 14 further comprising:

means responsive to said control signal for disabling said first gate means; and second gate means responsive to said control signal for gating the identity of a unit identified by said second priority means into said storage means.

* * * * *

UNITED STATES PATENT AND TRADEMARK OFFICE
CERTIFICATE OF CORRECTION

PATENT NO. : 4,028,663
DATED : June 7, 1977
INVENTOR(S) : Robert D. Royer and Thomas F. Schwab It is certified that error appears in the above-identified patent and that said Letters Patent are hereby corrected as shown below:

Column 3, line 68, after "data", the word --and-- should be inserted; line 68, "ad-" should read --addresses--. Column 4, line 1, "dressed" should be deleted; line 2, "and the memo-" should be deleted; line 3, "ries $M_{0,1}$ through $M_{0,1}$" should be deleted; line 15, "communicating" should read --communicated--. Column 5, line 60, "MAPP" should read --$\overline{MAPP}$--; line 60, "Q" should read --$\overline{Q}$--; line 61, "MAPP" should read --$\overline{MAPP}$--. Column 6, line 37, "the" should read --The--. Column 7, line 51, "MAPP" should read --$\overline{MAPP}$--; line 52, "MAPP" should read --$\overline{MAPP}$--. Column 8, line 35, after "such", the word --time-- should be inserted. Column 9, line 19, "order" should read --ordered--; line 56, "circuits" should read --circuit--. Column 10, line 57, "terminal" should read --interval--. Column 11, line 41, after "CPU-B1", the words --and CPU-B0-- should be inserted. Column 12, line 4, "we" should read --was--. Column 13, line 57, "gates" should read --gate--. Column 15, line 52, "set" should read --sent--. Column 16, line 45, "this" should read --This--. Column 17, line 24, "request" should read --requests--.

Signed and Sealed this

Eighth Day of November 1977

[SEAL]

Attest:

RUTH C. MASON
Attesting Officer

LUTRELLE F. PARKER
Acting Commissioner of Patents and Trademarks